United States Patent [19]

Shaw et al.

[11] Patent Number: 5,457,780
[45] Date of Patent: Oct. 10, 1995

[54] SYSTEM FOR PRODUCING A VIDEO-INSTRUCTION SET UTILIZING A REAL-TIME FRAME DIFFERENTIAL BIT MAP AND MICROBLOCK SUBIMAGES

[76] Inventors: Venson M. Shaw; Steven M. Shaw, both of 111 Reldyes Ave., Leonia, N.J. 07605

[21] Appl. No.: 909,312

[22] Filed: Jul. 6, 1992

Related U.S. Application Data

[63] Continuation-in-part of Ser. No. 686,773, Apr. 17, 1991, abandoned.

[51] Int. Cl.$^6$ .................................................. G06F 17/00
[52] U.S. Cl. ..................... 395/165; 348/38.4; 348/400; 382/305
[58] Field of Search .................................. 395/162, 163, 395/164, 165, 166; 382/41, 47, 56; 348/416, 390, 420, 573, 575, 384, 400, 415, 441

[56] References Cited

U.S. PATENT DOCUMENTS

| | | | |
|---|---|---|---|
| 4,375,650 | 3/1983 | Tiemann | 348/408 |
| 4,541,012 | 9/1985 | Tescher | 348/400 |
| 4,849,810 | 7/1989 | Ericsson | 348/416 |
| 4,920,571 | 4/1990 | Abe et al. | 382/300 |
| 4,963,995 | 10/1990 | Lang | 358/335 |
| 5,025,482 | 6/1991 | Murakami et al. | 382/239 |
| 5,057,932 | 10/1991 | Lang | 358/335 |
| 5,091,782 | 2/1992 | Krause et al. | 348/400 |
| 5,144,431 | 9/1992 | Citta et al. | 348/400 |
| 5,307,163 | 4/1994 | Hutano et al. | 348/415 |

OTHER PUBLICATIONS

Watabe et al., "Distributed Desktop Conferencing System with Multiuses Interface," IEEE Journal on Selected Areas in Communications, vol. 9, No. 4, May 1991, pp. 531–539.
Ahuja et al., "Networking Requirements of the Rapport Multimedia Conferencing System," IEEE, 1988, pp. 746–751.
Gultag et al., "A Single-Chip Multiprocessor for Multimedia: The MVP," IEEE, Nov. 1992, pp. 53–64.
Watabe et al., "A Distributed Multiparty Conferencing System and Its Architecture," IEEE 1990, pp. 386–393.
Ensor et al., "The Rapport Multimedia Conferencing System—A Software Overview," IEEE 1988, pp. 52–58.

Primary Examiner—Parshotam S. Lall
Assistant Examiner—Richard L. Ellis
Attorney, Agent, or Firm—Hoffman, Wasson & Gitler

[57] ABSTRACT

The present invention pertains to integrated circuit system based on novel architecture of Video-Instruction-Sec-Computing (VISC). The integrated circuit comprises a plurality of functional units to independently execute the tasks of remote communication, bandwidth adaptation, application control, multimedia management, and universal video encoding. The integrated circuit is also comprised of scalable formatter element connecting to the functional units which can inter-operate arbitrary external video formats and intelligently adapt to selective internal format depending upon the system throughput and configuration. Additionally, there is a smart memory element connecting to the functional units and scalable formatter, which can access, store, and transfer blocks of video data based on selective internal format. In the preferred embodoment, the integrated circuit is also comprised of an embedded RISC or CISC co-processor element in order to execute DOS, Window, NT, Macintosh, OS2 or UNIX applications In a more preferred embodiment, the integrated circuit includes a real time object oriented operation system element wherein concurrent execution of the application program and real time VISC based video instruction sets can be performed.

The present invention is designed to sustain the evolution of a plurity generations of the VISC microprocessors. These novel VISC microprocessors can be efficiently used to perform wide range of real time distributed video signal processing functions for applications such as interactive video, HDTV, and multimedia communications.

20 Claims, 5 Drawing Sheets

SYSTEM FOR PRODUCING A VIDEO-INSTRUCTION SET UTILIZING A REAL-TIME FRAME DIFFERENTIAL BIT MAP AND MICROBLOCK SUBIMAGES

This application is a continuation-in-part of application Ser. No. 07/686,773, filed Apr. 17, 1991, now abandoned.

FIELD OF THE INVENTION

The present invention is related to an integrated circuit system based on a novel architecture entitled Video-Instruction-Set-Computing (VISC). More specifically, the present invention not only provides the core functions for a initial single chip realization, it can also be evolved into several generations of scalable high performance microprocessors. In particular, these novel VISC microprocessors can efficiently perform broad range of real time distributed video signal processing functions for applications such as interactive video, HDTV, and multimedia communications.

BACKGROUND OF THE INVENTION

Video signal processing, of motion and still image information, represents a critical functional component for many emerging computing systems. All of the prior video signal processing techniques, that have been proposed or implemented, employ a single or plurality of special purpose coprocessors based on the more traditional CISC or RISC computing principle. Consequently, these CISC/RISC host coprocessors can only partially improve the performance of specific subsystems, such as video encoding for multiple algorithms, high speed frame memory retrieval, and dynamic display management. The significant advantage is however, their ability to adapt with all existing DOS, WINDOW, or UNIX program data structures, through a traditional application programming interface.

Though practical, the speed and performance of these techniques are severely limited by the system throughput, the mismatch of data types, and the rigid CISC and RISC processor and memory system architecture, which have been designed to optimize the performance for text or graphics data types, but inefficient for real time interactive video processing. For example, see U.S. Pat. No. 4,777,620 to Shimoni, U.S. Pat. No. 4,772,946 to Hammer, U.S. Pat. No. 4,7227,589 to Hirose, and U.S. Pat. No. 4,398,256 to Nussmier. Typically, these special purpose host coprocessors would be implemented either as digital signal processing or custom application specific integrated circuit (custom ASIC's).

While the aforesaid patents teach various methods and apparatus for compressing and decompressing video data, improve frame memory subsystem performance, and enhancing the image quality of the display data. None of the aforesaid patents have ever directed themselves to the concept and structure of an effective and generalized system architecture, which would priortize the complex video data types, and optimize performance for video signal processing, while the traditional CISC or RISC application programs can still be efficiently performed.

This novel method and apparatus would interconnect all data processors among consumer, communications, and desktop computing, allows for individuals to select and convey multiple forms of information such as sound, image, graphics, data, and live video, automatically adjust to the available bandwidth, and capable of communicating in multiple bandwidths.

More specifically, although prior arts have shown CISC and RISC can be extremely suitable for dedicated desktop computing in processing the traditional text and graphics data types. None of the aforesaid patents have directed themselves to the concept and structure of further broadening the scope, and to develop a new computing platform, This new platform would not only interconnect the traditional desktop data processors such as computers and workstations, but it would also interconnect television, VCR's, CD player, cameras, multimedia sensors, or any other consumer and communications data processors in a totally integrated environment. Consequently, in this novel integrated computing environment, complex video data types declare much higher priority, and require much higher run-time performance as comparing to the traditional text and graphics data.

OBJECTS OF THE INVENTION

An object of the present invention is to define a integrated computing architecture which can accomodate communications, both transmission and retrieval, of all digitally-coded or algorithmic complex video data types.

Another object of the invention is to provide a novel integrated system architecture which is flexible and allows the control and communications among television, VCR's, CD player, cameras, sensors, or any other consumer and communications data processors, as well as the desktop data processors such as computer and workstations.

A still further object of the present invention is to provide for a novel process architecture which not only allows for digital coding techniques, but also can interface with traditional analog storage or transmission techniques.

A still further object of the present invention is to provide for a novel process architecture which allows the human users to interface with application program, and to select the appropriate media combination either before or during the communication session.

A still further object of the present invention is to provide for a novel process architecture which not only allows for an optimized system performance for complex video data types, but also can directly execute traditional desktop application programs using a CISC or RISC application coprocessor.

A still furhter object of the present invention is to provide for a novel process architecture which allows for an object-oriented real time operating system for complex video data types, and would accomodate traditional UNIX, DOS, or other traditional desktop operating systems.

Further objects and advantages of the present invention will become apparent from a consideration of the drawings and ensuing description of it.

SUMMARY OF THE INVENTION

Our present invention, VISC architecture, offers a totally new computing platform. Distinguish from all prior arts whcih have employed the traditional CISC or RISC computing disipline, VISC provides new methods and apparatus to organize a plurality of complex video data types, VISC also streamline, optimize and preschedule the video instruction clusters, and provide parallel or pipeline execution for these instructions. VISC also facilitates a CISC or RISC application coprocessor to conveniently process the traditional DOS or UNIX applications. Finally, VISC provides a distributed object oriented operating system facilities which can provide concurrent execution of traditional DOS or UNIX operating systems with the real time VISC video signal processing functions.

Figure 2:
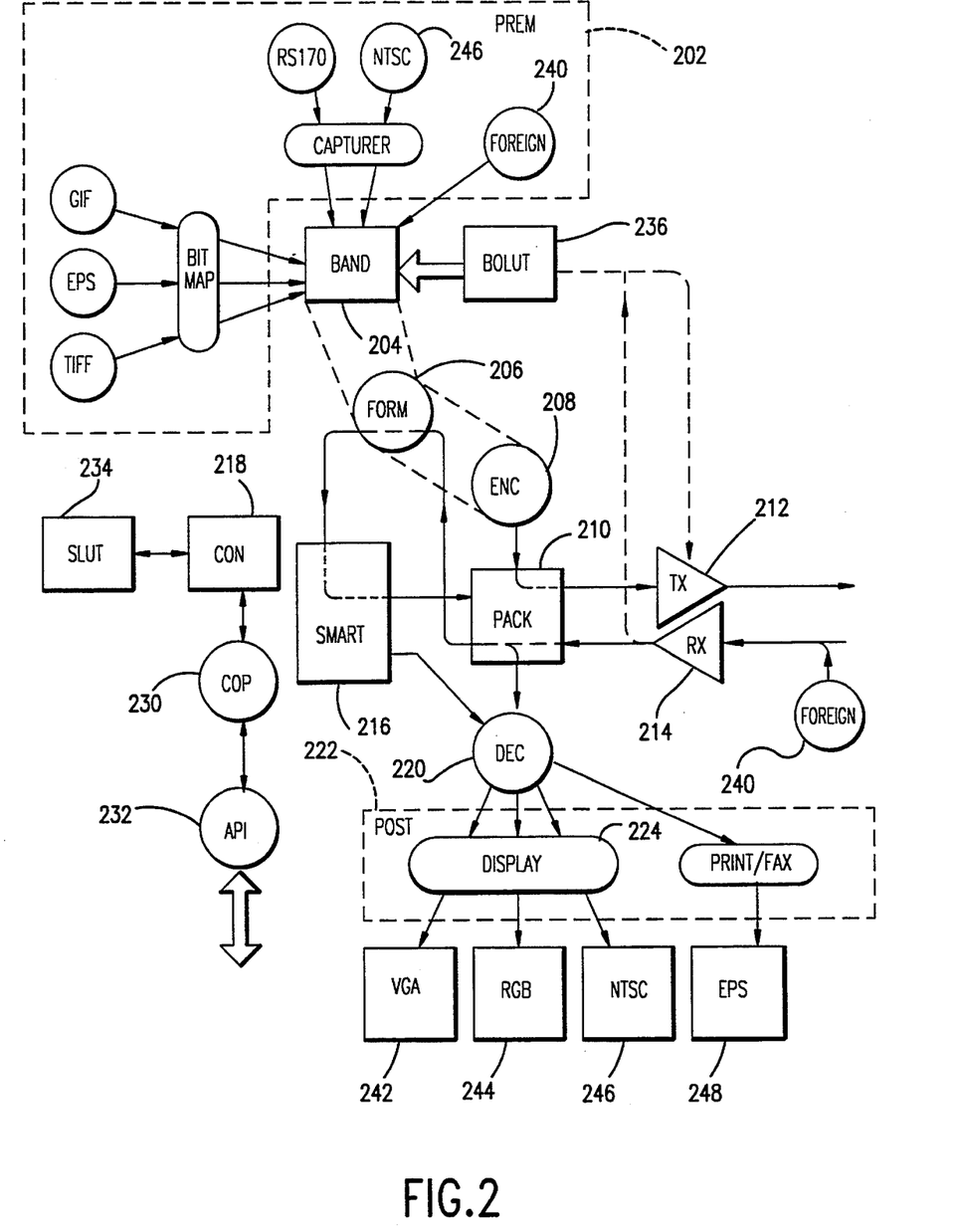
FIG. 2 shows the core VISC integrated circuit system architecture in accordance with the present invention.

FIG. 2 shows the architecture principle of VISC (Video-Instruction-Set-Computing). Contrary to a traditional RISC or CISC architecture, the data processors and memory system are completely optimized to facilitate block oriented data instead of the traditional bit-oriented data streams. To be more specific, data information are organized according to selective internally reconfigurable block format, wherein these internal format can accomodate various processor configurations as well as data throughput. A scalable smart memory system architecture and memory management unit also provides the programmable data block addressing, frame memory management, block data manipulation, and associative block search.

In addition, VISC instruction sets can be readily compiled into a set of system look-up tables (SLUT's). Based upon the run time bandwidth constraints caused by either network conjestion or application request, the VISC instruction processors can prefetch a group of such CISC intructions, and designate them with various functional units for parallel or pipeline execution. Comparing to the more traditional cache memory techniques widely used in the existing RISC or CISC computer, The SLUT technique employes intelligent fast associative search schemes, and is able to perform scheduling, compilation, assembling, and simultaneously issuing instructions for execution and memory management.

In the VISC architecture, a smart memory system is connected to the functional units and scalable formatter, which can access, store, and transfer blocks of video data based on the selective internal format.

Figure 4:
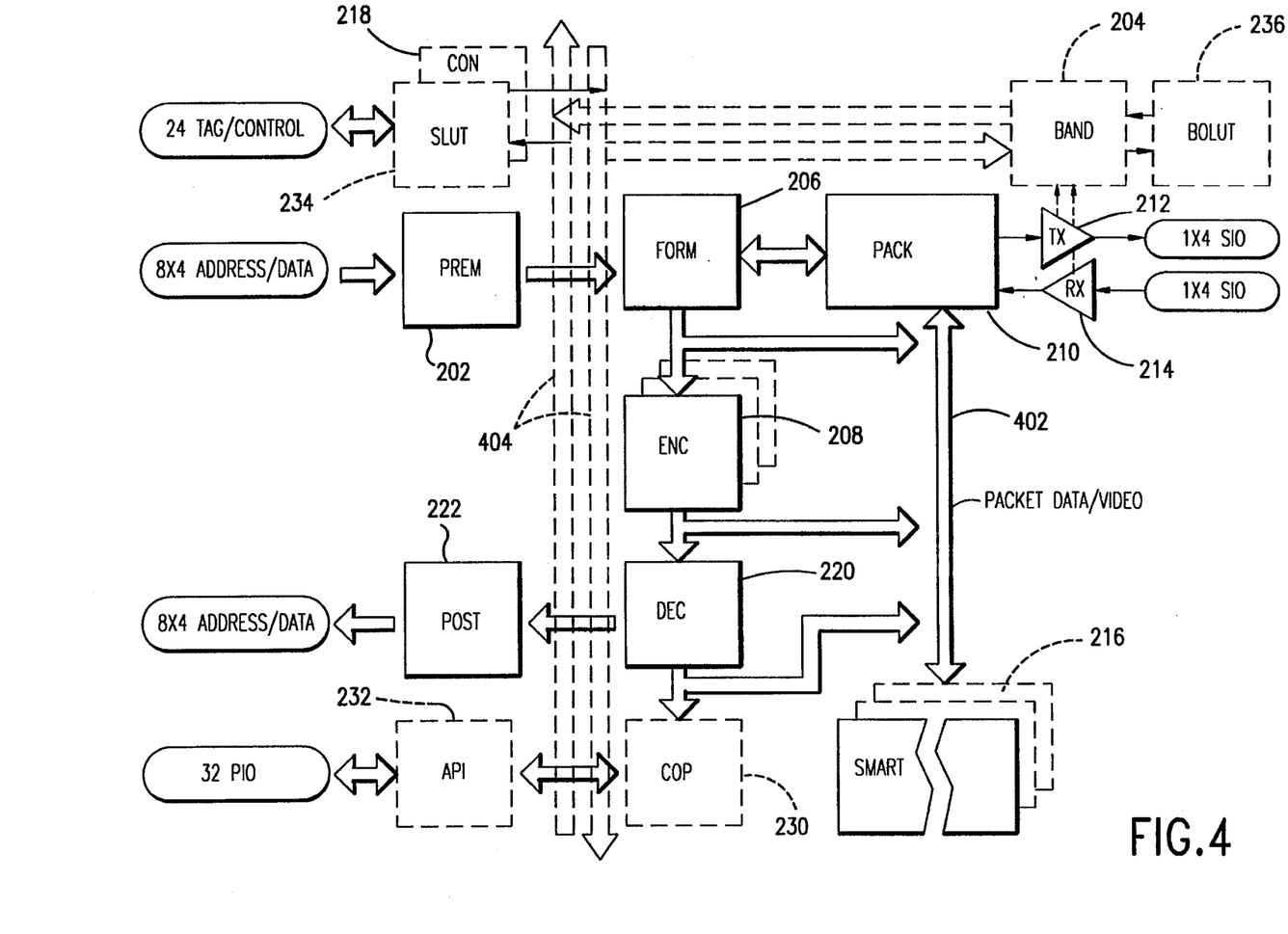
FIG. 4 is a detailed block diagram illustrating a single chip VISC integrated circuit in accordance with the present invention.

In FIG. 4, VISC architecture also illustrate an embedded RISC or CISC coprocessor (COP) element in order to directly execute the bit oriented application programs in DOS, Window, NT, Macintosh, OS2, or UNIX. In a more preferred embodiment, a VISC can include a real time object oriented operation system wherein concurrent execution of the application program and real time VISC based video instruction sets can be performed, VISC architecture provides a single computing platform to perform a plurity of complex data types including motion video, voice, data, still image, and animated graphics. Consequently, it becomes feasible to integrate digital television, computer 108, cameras, 104s with human users and traditional application program.

DETAILED DESCRIPTION OF THE PREFERRED EMBODIMENT

GENERAL DISCUSSION

Figure 1:
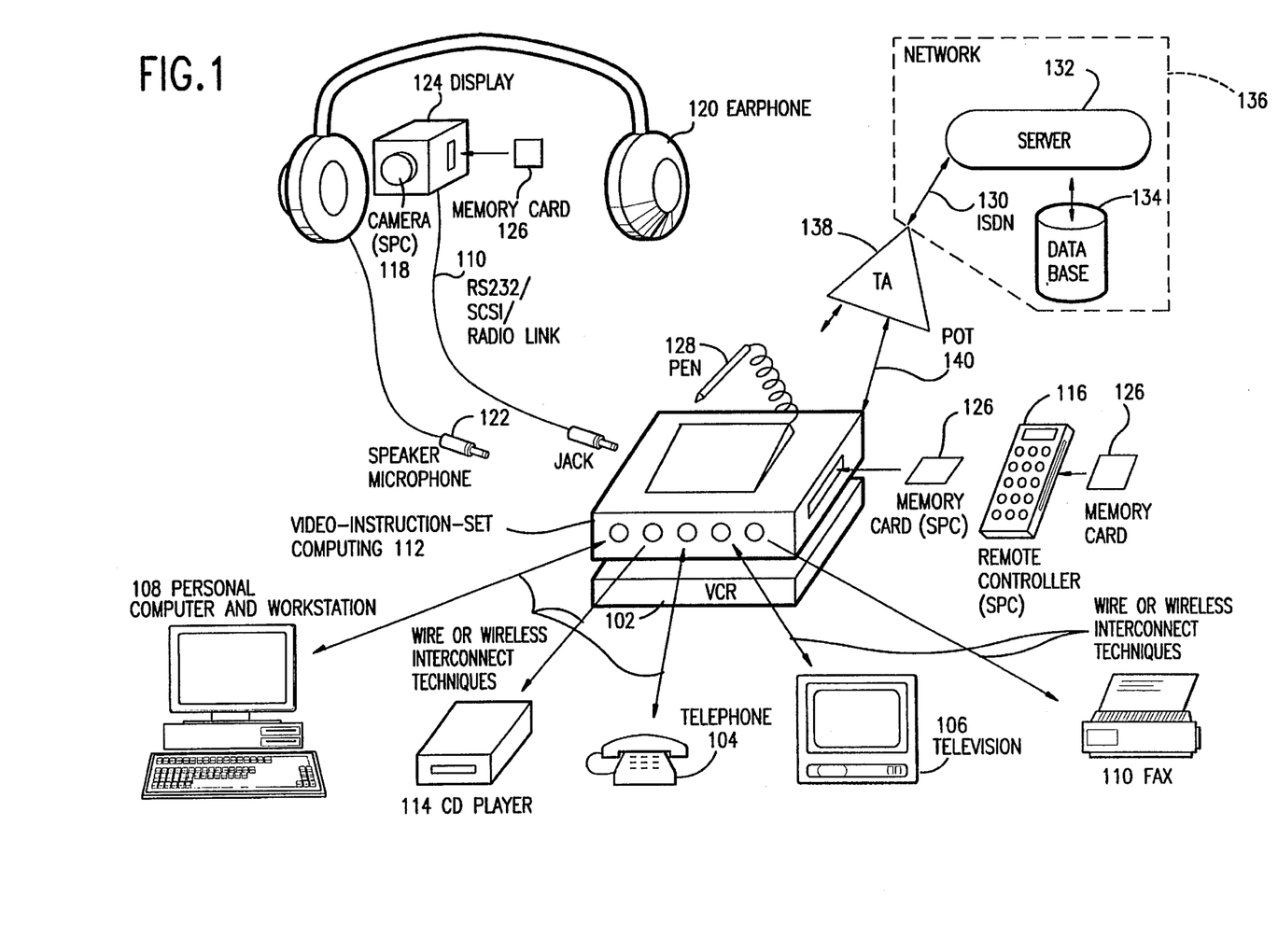
FIG. 1 shows the picturial illustration of a video instruction set computing (VISC) system environment.

Referring now to the drawings wherein like reference numerals refers to similiar or identical parts throughout the several views, and more specifically to FIG. 1 thereof, there is shown a picturial representation of an novel integrated circuit VISC 112 (video instruction set computing) system apparatus. there is also shown a picturial illustration depicting most of the popular electronic apparatus relating to computer 108, communications, and consumers, presently available for the homes or offices. These include a VCR 102, CD Player, 104, television, personal computer 108, and fax machine.

It is Applicant's intention to disclose a unified system method towards integrated circuit design of all future generations' interactive television, video communications, and visual computing syetms.

It is also Applicant's intention to illustrate the architecture design of the VISC apparatus 112 according to this unified system design method.

Furthermore, The VISC 112 system apparatus allows for comaptibility with all existing electronic apparatus. VISC user/operator can control, complement, and utilize the functions of each electronic apparatus by means of the VISC 112 system apparatus. The VISC apparatus 112, being of compact size and shape, similar to that of a VCR 102, notebook PC, remote controller 116, or smaller, can locally integrate all existing electronic apparatus, and permit them to function complimentary with each other.

It is yet another Applicant's intention to further substantiate a distributed system architecture for VISC 112, in which a plurity of VISC's apparatus 112 can remotely communicate with each other and can also communicate with other non-VISC apparatus, regardless of whether other apparatus were analog, digital or algorithmic, and to encode or decode automatically to the available bandwidth, in a totally integrated system environment.

GENERAL INTRODUCTION OF VISC

FIG. 2 illustrates the core system architecture, operation, and methodology for a single chip design and implementation of VISC 112 integrated circuit. This VISC 112 microprocessor apparatus would make it possible to exchange a multitude of different forms of video articles over a wide range of communications networks. Prior arts have shown methods and apparatus to improve compression and decompression techniques for individual video coding algorithm and individual bandwidth ranges. However, since video coding algorithms are intrinsically incompatible with each other, there is a need for an apparatus to provide common interface whereby incompatible equipment can freely exchange video objects through interfacing with such apparatus.

The diagramatic representation illustrated in FIG. 2 comprises the following major system components. They are a preprocessing/motion processor (PREM) 202, a postprocessor (POST) 222, a bandwidth processor (BAND) 204, a formatting processor (FORM) 206, a encoding processor (ENC) 208, a packet processor (PACK) 210, a smart memory (SMART) 216, a transmission processor (TX) 212, a receiving processor (RX) 214, a decoding processor (DEC) 220, and a system controller (CON) 218.

The PREM 202 (preprocessing/motion processing) integrated circuit is able to capture, preprocess, differentiate, and generate a motion vector 302 signal either for a sequential input frames of live motion video, still photo image, or animated bit-mapped graphic files. Referring to FIG.2, The PREM 202 integrated circuit is further comprised of a video input capturer and a graphics input bit-mapper adapting elements. The video input capturer produces a digital video signal corresponding to any external video input conforming to RS-170, NTSC 246, PAL, or SCAM video formats. The graphics input bit-mapper, on the other hands, produces a digital signal corresponding to any animated graphics or still image input files conforming to PCX, GIF, EPS 248, TIFF, or alike popular file formats. The PREM 202 is also comprised of a memory element connecting to these input adaptors for receiving, storing, and transferring these digital video or bit-mapped graphics input signal. In a preferred embodiment, the PREM 202 integrated circuit is further comprised of a processor element which produces a differential frame signal and a motion vector signal corresponding to the sequential input frames of motion video, still image, or animated graphic files. the preocessor element produces a digital signal blocks conforming to the CCITT CIF or SIF video formatting standard. Both the processor element and the memory element can be specifically designed to optimize the performance of transferring, storage, retrieval, and processing of these CCITT CIF/SIF compatible digital signal blocks. In a more preferred embodiment, the PREM 202 is further comprised of a single or plurality of integrated sensor element, the sensor element produce the required inputs corresponding to the energy it received, the processor and memory element can efficiently perform similar analog and digital functions corresponding to other non-VISC foreign inputs including but not limited to text, data, and audio data streams.

The BAND 204 (bandwidth processor) integrated circuit is able to compute the required communication bandwidth for a local or remote digital video signal and generate a list of run-time attributes for the appropriate compression ratio, frame rate, and display resolution. The BAND 204 integrated circuit is also able to sensitize run-time networking traffic conditions, and dynamically reconfigure the aforementioned run-time attributes corresponding to the available run-time communication bandwidth. The BAND 204 integrated circuit is further able to sensitize user input or appliaction-specific requirements 356 and interactively update the aforementioned run-time attributes. Preferrably, the BAND 204 integrated circuit is further able to exchange a variety of digitally encoded input and output foreign video signals corresponding to intrinsically incompatible video coding algorithms whereby incompatible transmission, storage, retrieval, and display apparatus can inter-operate through such interface.

The BAND 204 integrated circuit is comprised of a look-ahead-pipelined processor element connected to the PREM 202 and RX (receiving processor) integrated circuit, which receives a local or remote inbound differential video signal and motion vector 302, it then calculate and produce a corresponding run-time attributes signal. The BAND 204 integrated circuit is also comprised of a controller element connected to the FORM 206 (format processor), ENC 208 (encoding processor) and CON 218 (system controller) integrated circuits, which receives a set of initial run-time attributes according to the algorithmically pre-determined default parameters retaining within the SLUT 234 (system look-up-table). Provided said video signal is requested by the CON 218 for outbound transmission, The BAND 204 integrated circuit is further comprised of a sensitizing 342 circuit connected to the TX 212 (transmission processor), which can intelligently analyze a plurality of networking traffic conditions, and dynamically reconfigure the run-time attributes corresponding to the available communication bandwidth. The aforesaid sensitizing 342 circuit will first initiate a request signal sending to the TX 212 along with the required communication bandwidth data, it will then either receive a grant signal from the TX 212 provided the network condition is sufficient, or TX 212 will issue a run-time bandwidth allowance signal to BAND 204 integrated circuit corresponding to the realistic network traffic condition. the BAND 204 integrated circuit will further produce a request for reset signal to the FORM 206, ENC 208, and CON 218 integrated circuits in order to reset the SLUT 234 table, and to reconfigure the appropriate run-time attributes. In a more preferred embodiment, the BAND 204 integrated circuit is further comprised of a user/application interface element connected to the FORM 206, ENC 208, and CON 218 integrated circuit which receives a plurality of signals regarding user/operator preference or application-specific requirements 356, it then send these signals to the processor element and dynamically produce a plurality of optional run-time attributes, the BAND 204 integrated circuit will further interact with the CON 218, FORM 206, and ENC 208 integrated circuits and to finalize the run-time attributes corresponding to the available communication bandwidth. In a further preferred embodiment, the BAND 204 integrated circuit will comprised of a interoperating circuit connected to the RX 214 and TX 212 integrated circuit in receiving a inbound video signal from RX 214 according to a SLUT 234 encoded video coding format, it then reset the SLUT 234 parameters and translate the inbound signal into a oubound signal according to another video coding standard, it further reformat the outbound signal and send to TX 212 for further transmission.

The FORM 206 (formatting processor) integrated circuit is able to statically compute the processing and storage bandwidth requirement corresponding to the run-time attribute lists of a digital input video signal, and translate them into an unified internal data format structure according to the run-time integrated circuit processing capabilities. The FORM 206 integrated circuit is also able to statically schedule, optimize, and produce the appropriate instruction and task sequences, then dynamically parse and partition them into a plurality of continuous signaling bitstreams for the fine grained pipelined or parallel encoding or decoding operations of the input video signal. Preferably, the FORM 206 integrated circuit is further able to provide multidimensional rotation, shifting 360, preprocessing, and retrieval of the CIF or SIF compatible input signal blocks, The FORM 206 is further able to dynamically invoke system calls and look-up and reconstruct its run-time internal format corresponding to a plurity of system clock and SLUT 234 parameters options, external networking conditions, and interactive user appliaction requirements 356.

The FORM 206 integrated circuit is comprised of a interpolating and exterpolating processor element connected to the BAND 204 integrated circuit, which receives list of run-time attributes corresponding to a local or remote differential video signal and motion vector 302, and statically look-up nad formulate an internal data structure according to the pre-assigned system clock and SLUT 234 parameters. The FORM 206 integrated circuit is also comprised of a prescheduler connected to the ENC 208 and DEC 220 integrated circuit, which optimize, partition, and produce a coherent flow of instruction and task bitstreams for the required fine grained pipelined or parallel encoding and decoding operations. In a more preferrable embodiment, the FORM 206 is further comprised of a dynamic data format processor, which receives incoming data signals and perform multi-dimensional access, retrieval, rotating 358, shifting 360, and preprocessing according to the internally formatted data. the BAND 204 is further comprised of a dynamic program scheduler and optimizer connected to BAND 204 integrated circuit, which receives alert signal and further reformat the data signals corresponding to user application inputs and external networking conditions, in a further preferrable embodiment, the FORM 206 is further comprised of a scaling circuit connected to the SMART 216 (smart memory) integrated circuit, which invoke system calls and dynamically adjust system clock rate, aspect ratio, and SLUT 234 parameters in providing a linearly scalable VISC 112 system.

The ENC 208 (encoding processor) integrated circuit is able to encode a sequence of internally formatted input still or motion video signal and translate them into a bitstream of tokens corresponding to a plurality of pixel or frequency domain encoding algorithms. The ENC 208 is also able to encode the selective pixel or frequency domain algorithm at either macroblock, group of block, partial frame, or whole frame image level in order to achieve the selective VISC 112 system throughput. Preferrbly, the ENC 208 is further able to encode the algorithms employing additional external coprocessor elements. The ENC 208 integrated circuit is comprised of a instruction or task queuing circuit connected to the FORM 206, which receive and decode the prescheduled instruction task sequences for an entire encoding operation. The ENC 208 integrated circuit is also comprised of a pixel domain encoder and a frequency domain encoder circuits connected to the FORM 206 integrated circuit, which received the internally formatted still image or motion video signal, and produces bit streams of encoded tokens corresponding to a plurality of externally selectable image coding algorithms. The ENC 208 integrated circuit is further comprised of a pipelined buffer circuit connected to the SMART 216, and PACK 210 integrated circuits, which either transfer the encoded tokens to SMART 216 for internal storage or ship to the PACK 210 for outbound transmission. In a more preferrable embodiment, The ENC 208 is also comprised of a interface circuit which can pipeline, cascade, or parallelize a plurality of external encoding processor elements, and encode pixel and frequency domain algorithm at macroblock, group of block, partial frame, or whole frame level.

The PACK 210 (packet processor) integrated circuit is able to transcode or format video signals in CIF or SIF compatible macroblocks 306, it is also able to store, retrieve, or relay the transcoded CIF or SIF video signal in a single or plurality of packets or ATM (asyncronous transmission mode) cells for an inbound or outbound communication session. Preferrably, The PACK 210 is further able to correlate the CIF or SIF macroblocks 306 into VISC 112 internal format, and transcode voice, data, graphics, and other non-video 240 data types in CIF or SIF macroblock-based packets or cells.

The PACK 210 is comprised of a protocol processor element connected to the ENC 208 and TX 212 integrated circuit, which receives an encoded CIF or SIF compatible video signal macroblocks 306 from ENC 208, and generate and outbound a single or plurality of data, control, and maintainance packets to TX 212. The PACK 210 protocol processor element also connected to the DEC 220 and RX 214 integrated circuit, which receives an inbound video packet or cells from RX 214, and generates and relay a plurality of CIF or SIF compatible macroblocks 306 to DEC 220 for further decoding. The PACK 210 integrated circuit is also comprised of a pipelined buffer element connected to the TX 212 (transmission processor) and RX 214 (receiving processor) integrated circuit, which transmit and receive video signal in CIF or SIF compatible packets or ATM cells. The PACK 210 is further comprised of a address generation circuit connect to pipelined buffer element and F and SMART 216 integrated circuit, which access and transfer a CIF or SIF packets or cells into VISC 112 internal format via F, and then systematically enable the pipeline buffer circuit to download and store the reformatted CIF or SIF packets or cells in SMART 216. Reversely, the pipelined buffer element further retrieve directly the internal formatted packets and cells from SMART 216, and translate into CIF or SIF compatible macroblocks 306 via F. In a more preferred embodiment, the protocol control processor connected via TX 212 and RX 214 to a plurality of external PACK's 210, whcih establish, maintain, and terminate point-to-point and point-to-multipoint networking sessions, it further parse, assemble, or disassemble a video signal representation in CIF or SIF packets or ATM cells forms, according to specific TX 212 or RX 214 request and run-time networking conditions. In a further preferred embodiment, the protocol control processor element can transcode layerer signalling data structure according to OSI protocol architecture, which corresponds a plurality of user preference, application requirement, session control, transmission set-up, network control, and logical or physical link setup and termination, and the alike, and transcode non-video 240 data types in VISC 112 internal format.

The SMART 216 (smart memoty) integrated circuit is able to provide an optimized article-oriented architecture to address, store, and retrieve a single or plurality quantities of background still image and foreground motion video articles in accordance with the selected VISC 112 internally optimized format. The SMART 216 is also able to provide a set of run-time variables correspond with user, application, and networking conditions, and dynamically reconfigure itself to address, store, and retrieve these most-recently-optimized video articles. Preferrably, The SMART 216 is further able to provide a set of alternative referencing parameters in order to dynamically move, overlay, rotate, enlarge, or reduce a single or plurality of motion video articles at run-time without physically modifying or moving their address and data.

The SMART 216 integrated circuit is comprised of single or plurality of memory cells and their associated sensing, control, management, and interface circuits connected to the F integrated circuit, which receives a single or plurality of VISC's 112 internally modified CIF or SIF macroblocks 306, and produce an optimized data structure to perform an article-oriented addressing 308, storage, and retrieval of the still and motion video articles. The SMART 216 is also comprised of a run-time adaptive decision-logic circuit connected to the CON 218, BAND 204, and ENC 208 integrated circuit, which receives a set of run-time variables correspond with user, application, and networking conditions, and produces a run-time executable configuration in order to address, store, and retrieve these most-recently-optimized video articles. In a more preferred embodiment, the SMART 216 is further comprised of a pointer manipulation circuit connected to the ENC 208, DEC 220, CON 218, POST 222, and PREM 202 integrated circuits, which receives run-time requests to move, overlay, rotate, enlarge, or reduce a single or plurality of these stored video articles, and produces the appropriate alternative referencing parameters to dynamically manipulate these articles without physically modifying or moving their address and data. In further preferred embodiment, the SMART 216 is comprised of pipeline self-synchronization circuit connected to the CON 218, PREM 202, BAND 204, FORM 206, ENC 208, PACK 210, and DEC 220 integrated circuits, which sensitize and register the abnormal instances of PREM 202, BAND 204, F, ENC 208, DEC 220, and PACK 210 subsystem's pipelined operations, and send a system alert signal to CON 218 in requesting further fine-tuning of the system look-up-table, the CON 218 would then examine the bottlenecked subsystems, identify their overload causes, then authorize and adjust the SLUT 234 parameters to properly scale down the specific subsystem processing and still to maintain the overall system performance, the SMART 216 will then issue selective set of control signals including, but not limited to task redirection, data reformatlng, MOP 374 inseration, threading, or delay branching to adjust the specific overloaded subsystem, and to resume overall system pipeline syncronization.

The TX 212 (transmission processor) and RX 214 (receiving processor) integrated circuit is able to transceive video signal according to a plurality of networking environments and a plurality of run-time bandwidth conditions. The TX 212 and RX 214 comprised of a single or plurality pairs of transceivers corresponding to a plurality of analog or digital networks including, but not limited to: braodband ISDN 130, FDDI, MAN, DS3, twisted-pair or coaxial LAN, switch or dedicated T1, primary rate ISDN 130, fractional T1, frame relay, ISDN 130 switched H1, single or dual channel basic rate ISDN 130, digital swithed or private PSDN, analog twist-pair, basic rate ISDN 130 D channel, or analog twist-pair. The TX 212 and RX 214 are also comprised of sensitizing 342 circuit connected to the BAND 204 integrated circuit which sensitizes a plurality of run-time networking conditions and generate run-time bandwidth allowance whcih includes, but not limited to: 150 Mbs, 100 Mbs, 45 Mbs, 10 Mbs, 2.048 Mbs, 1.544 Mbs, 384 Mbs, 128 Mbs, 64 Kbs, Px 64 Kbs, 56 Kbs, 19.2 Kbs, or 9.6 Kbs. In a more preferred embodiment, the TX 212 and RX 214 is further comprised of a self-configuration circuit connected to the CON 218 and ENC 208 integrated circuit, which receives application requirements 356 and user preference, and generate the appropriate run-time bandwidth signal.

The DEC 220 (decoding processor) integrated circuit is able to correspond a bitstream of encoded tokens, and decode them into still or motion video signals according to a plurality selections of pixel or frequency domain coding algorithms. The DEC 220 is also able to decode the selective pixel or frequency domain algorithm at either macroblock, group of block, partial frame, or whole frame image level in order to achieve the selective VISC 112 system throughput. Preferrbly, the DEC 220 is further able to selectively decode the algorithms with either software program, internal hardware, or employing additional external coprocessor elements. The DEC 220 integrated circuit is comprised of a pixel domain and a frequency domain decoder circuits connected to the SMART 216 and PACK 210 integrated circuits, which received a bit stream of encoded tokens, and produce a sequence of fully decoded still image or motion video signal corresponding to a plurality of externally selectable image coding algorithms. The DEC 220 integrated circuit is also comprised of a instruction or task queuing circuit, which stores and produces a sequence of prescheduled instruction tasks for the entire decoding procedures. The DEC 220 integrated circuit is further comprised of a pipelined buffer circuit connected to the SMART 216, and PACK 210 integrated circuits, which either receives internally or externally encoded tokens from SMART 216 or PACK 210 for furhter decoding, transfer the decoded signals to SMART 216 for internal storage, or relay to the decoded signal to PACK 210 for outbound transmission. In a more preferrable embodiment, The DEC 220 is also comprised of a interface circuit which can pipeline, cascade, or parallelize a plurality of external decoding processor elements, or simply employ internal hardware or software program to decode pixel and frequency domain algorithm at macroblock, group of block, partial frame, or whole frame level.

The POST 222 (postprocessing) integrated circuit is able to generate a selective set of live video, sequential stills, or bit-mapped graphics image output signal corresponding to the VISC 112 internal signal blocks it received from the decoder (DEC) 220. As the concept of VISC 112 internal signal formatting and decoder integrated circuit design should become more apparent after the later disclosure of other integrated circuit elements. The POST 222 is further comprised of a display adaptor (Da), and a print/fax adaptor (Pf) output circuits. Both the Da and Pf output adapting circuits are connected to the decoder (DEC) 220 integrated circuit for receiving a VISC 112 comaptible internal processing signal. The Da output adapting circuit produces a VGA 242, RGB 244, or NTSC 246 compatible output signal for further displaying live video, animated graphics, or sequential image output. The Pf adaptor output circuit produces a G3, G4, or encapsulated postscript (EPS) compatible output file for further printing or faxing a freezed frame of motion video, still image, or still graphics. In a preferred embodiment, the POST 222 integarated circuit is also comprised of a buffer element for receiving the processing signal and storing the processing signal from the decoder integrated circuit. The POST 222 can also efficiently printout, fax , or display output other non-VISC foreign data streams.

The CON 218 (system controller) integrated circuit is able to control and coordinate individual subsystem pipeline operations, to maintian and manage overall video data throughput, and to sensitize and adapt external application, user, networking conditinal branches. The CON 218 integrated circuit is also able to initiate, maintain, and update a set of run-time executable system look-up-tables (SLUT's) 234, and to facilitate static task prescheduling and lookahead 338 instruction presequencing according to the specific input video data types, The CON 518 is further able to provide run-time coordination among individual subsystems and to reconfigure each subsystem's functionalities in maintaining a scalable overall system pipeline performance.

The CON 218 integrated circuit is comprised of a dynamic storage and retrieval data structure for implementing a system look-up-table connected to PREM 202, which receives a differential frame bit-map corresponding with specific input video data types, the SLUT 234 then cross reference and generate a set of run-time parameters including, but not limited to: compression ratio, frame rate, and display resolution. The CON 218 is also comprised of a task prescheduler circuit connected to SLUT 234 and every VISC 112 pipelined subsystems, which further translate the selective run-time SLUT 234 parameters into a specific set of run-time encoding, decoding, and frame updating instruction sequences for the pipelined ENC 208, DEC 220, and POST 222 integrated circuits. In a more preferred embodiment, the CON 218 further analyze each subsystem's pipeline operations requirement, and further generate an appropriate scalable internal data format in accomodating the available hardware processing and memory throughput. In a further preferred embodiment, the CON 218 is further comprised of a dynamic reconfiguration circuit, whcih sensitize and adapt with system's run-time critical paths, subsystem bottlenecks, networking conditions, user preference, and application's requirements 356, and to insert conditional branch instructions, and to relieve specific overloaded subsystem's functional requirement in maintaining overall system throughput.

OPERATIONS OF VISC'S

Figure 3A:
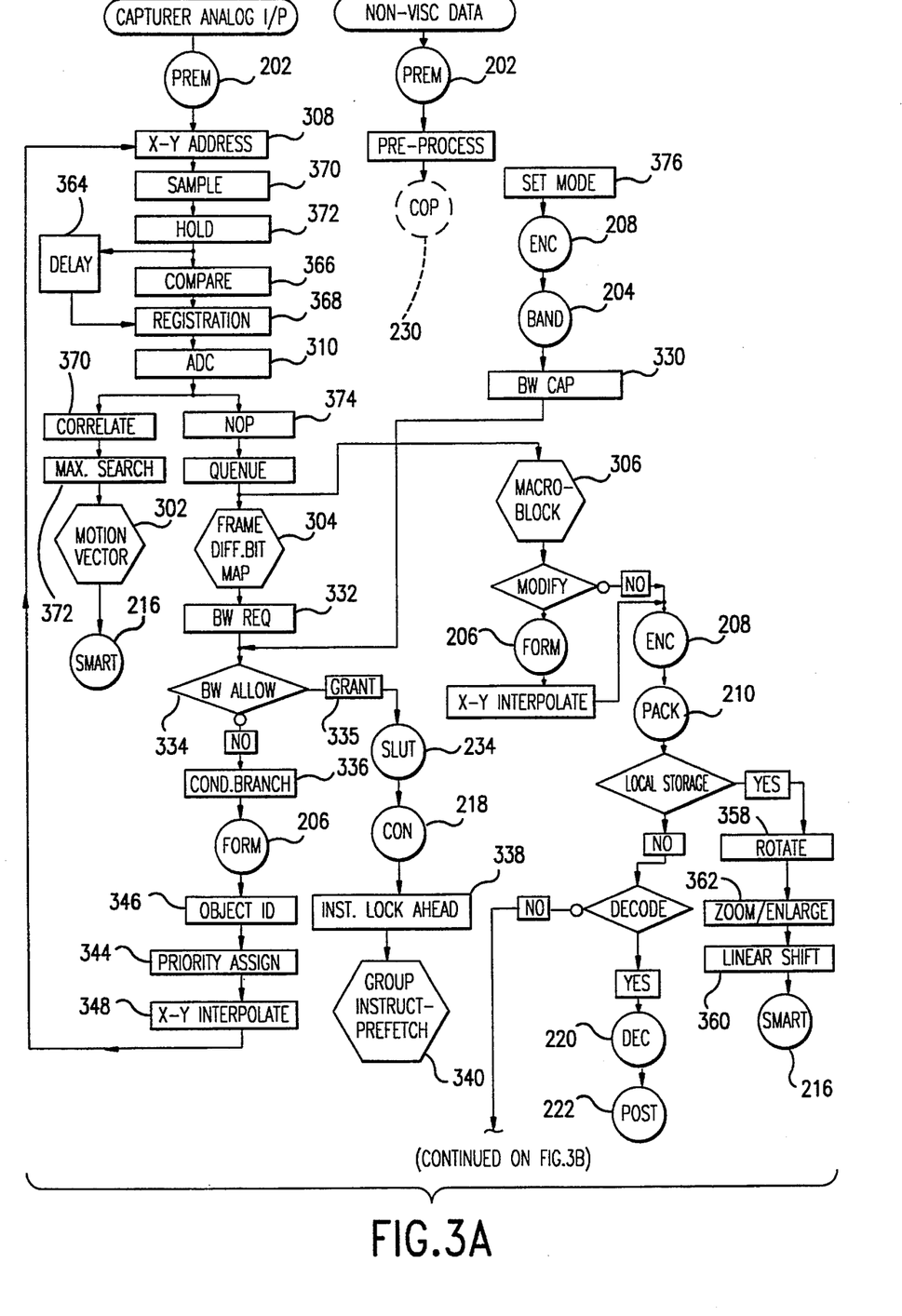
FIGS. 3A and 3B illustrate the major functional operations for a VISC (video instruction set computing) integrated circuit in accordance with the present invention.
Figure 3B:
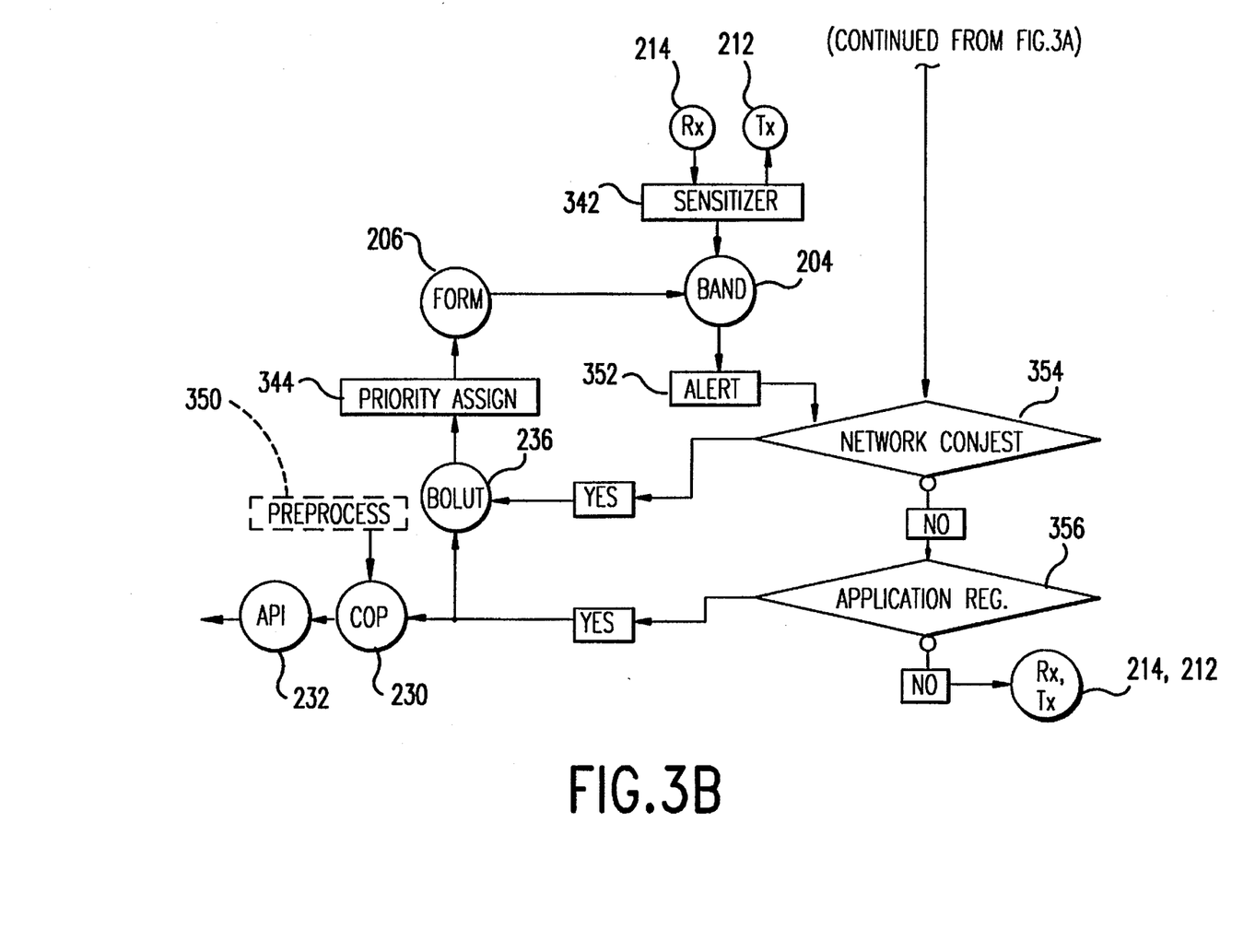

FIG. 3 illustrates the major functional operations for a VISC 112 integrated circuit system, which includes analog and digital preprocessing (PREM 202, API 232, COP 230), look-ahead 338 bandwidth and instruction management (BAND 204, SLUT 234), run-time application priority interface (API 232, BOLUT 236, COP 230), dynamic network communication management (TX 212, RX 214, BAND 204, FORM 206) scalable self-reconfigurable processing (FORM 206), unified packet control processing (PACK) 210, a scalable memory array reconfigurable architecture (SMART) 216, and analog and digital postprocessing (POST) 222.

It is worth mentioning that instead of focusing on specific implementations and apparatus, we intend to address all the generic critical methods which are required for VISC 112 system realizations. These methods can be implemented in a plurality of integrated circuit technologies.

A. ANALOG AND DIGITAL PREPROCESSING (PREM 202, COP 230, API 232)

The PREM 202 is comprised of a plurality of analog and digital preprocessing steps to capture or receive an analog or video input, to analyze and identify the forground motion video objects, to generate their associated linear motion vector 302, and produces a sequence of digital video frame data and their corresponding differential frame bit-maps 304. The PREM 202 is further comprised of functional steps to accept, preprocess, and prepare traditional non-VISC data types, and to forward to internal VISC 112 circuits for further processing.

The PREM 202 is comprised of an ANALOG INPUT CAPTURER circuit, which receives analog input conforming to a plurality of video formats including but not limited to NTSC 246, PAL, RS170, SCAM.

The PREM 202 is also comprised of X-Y ADDRESSING 308, SAMPLE 370 and HOLD 372 circuits which receives a continuous sequence of analog live video input and either produces a set corresponding analog video signals, reference to a selective sets of random video frames, or extract a specific set of REGION OF INTEREST (ROI) subimage (for example, in MACROBLOCK form) from the input.

The PREM 202 is furhter comprised of DELAY 364, COMPARE 366, REGISTRATION 368, and ADC 310 (analog-to-digital conversion) circuit, which references a plurality of input video frames and produces a corresponding set of digital frame data and their associated DIFFERENTIAL FRAME BIT-MAPs.

The PREM 202 is further comprised of X-Y ADDRESSING 308, DELAY 364, COMPARE 366, REGISTRATION 368 circuit connected to the API 232, CON 218 and BOLUT 236, which receives a set of priority requests for application-specific objects, and identify and generate corresponding ROI (REGION OF INTEREST) for each object.

The PREM 202 is further comprised of ADC 310, DELAY LOOP 364, CORREALTE 370, SEARCH, and MATCH 372 circuits for calculating and producing digital motion video object profiles and their corresponding linear MOTION VECTORs. The MOTION VECTORs are forwarded to SMART 216 or other temporary storage.

Preferrably, PREM 202 is also comprised of a preprocessing circuit 350 connected to the COP 230, which can receive traditional non-VISC 240 data types, and reorganize and produce an appropriate internal data format for VISC 112 processing.

B. LOOK-AHEAD BANDWIDTH AND INSTRUCTION MANAGEMENT (BAND 204, SLUT 234)

The BAND 204 integrated circuit receives a sequence of frame differential bit-maps 304 corresponding to each input video signal, it then reference each bit-map 304 to the SLUT 234 in deriving the required run-time attributes includes compression ratio, frame rate, and display resolution. The run-time attributes will further translate into the required run-time transmission and processing bandwidth, BAND 204 will further generate and prefetch 340 a group of predefined VISC 112 pipelined instructions for further execution.

BAND 204 is comprised of BWCAP 330 circuit connected to ENC 208 and SMART 216, which receives processing, storage, and transmission bandwidth availability signals as soon as the system functions are initialized (SETMODE 376). The BAND 204 is also comprised of a BWREQ 332 circuit connected to PREM 202, whcih receives FRAME DIFFERENTIAL BIT-MAP 304 and produces a BWREQ 332 (bandwidth requision) signal. The BAND 204 will compare BWCAP 330 signal with BWREQ 332 signal in determining whether the run-time communication and processing bandwith is sufficient.

Provided the bandwith is sufficient, BAND 204 is further comprised of a SLUT 234 (system look-up-table), INSTRUCTION LOOK-AHEAD 338, AND INSTRUCTION GROUP FETCH 340 circuits, which can receives FRAME DIFFERENTIAL BIT-MAP 304 signal and prefetch 340 a group of VISC 112 instructions for further processing of the video data.

Provided the bandwidth is not sufficient, BAND 204 will issue a CONDITIONAL BRANCH 336 and transfer the video data to FORM 206 for further bandwidth reduction. FORM 206 is further comprised of OBJECT ID 346, PRIORITY ASSIGN 344, and X-Y INTERPOLATE 348 circuits, whcih receives full frame or subframe of digital video data form BAND 204, reduce BWREQ 3:32 signal for lower priority objects through further horizontal and vertical interploatlons 348.

C. RUN-TIME APPLICATION PRIORITY INTERFACE (API 232, BOLUT 236, FORM 206, COP 230)

The API 232 (application programing interface) is comprised of a PRIORITY ASSIGN 344 circuit connected to the BOLUT 236, which receives a set of application-specific input priority requirements 356, and generate a corresponding set of media data types conforming to the run-time bandwidth availability. The PRIORITY ASSIGN 344 circuit is also connected to the FORM 206 integrted circuit, which produces a PRIORITY REASSIGN 344 signal provided run-time bandwidth is not available, the FORM 206 will in turn produces a modified internal format corresponding to the reassiged priority list, and associate each PRIORITY REASSIGN 344 signal with the corresponding video OBJECT ID 346 during run-time.

The COP's 230 are connected to the PREM 202, which receive preprocessed 350 non-VISC data types 240, and provide traditional RISC or CISC like application processing. The COP's 230 is further connected to the API 232, whcih receives PRIORITY REASSIGN 344 signal and generates a BWREQ 332 signal to BOLUT 236 for further assurance of the run-tiem bandwidth availability.

D. DYNAMIC NETWORKING MANAGEMENT (TX 212, RX 214, BAND 204, FORM 206)

The BAND 204 integrated circuit is comprised of a SENSITIZING 342 circuit connected to the RX 214 and TX 212, which constantly look out to the network and generate a ALERT 352 signal to the VISC 112 internal system when it receives a change of run-time communication bandwidth signal. The VISC 112 internal system will generate a NETWORK CONJEST 354 query and compare against the required run-time outbound transmission bandwidth during that time period. Provided the outbound transmission bandwidth is more demanding, BAND 204 will transfer the outbound transmitting signal to FORM 206 for further reduction of the bandwidth prior to their transmission.

E. SCALABLE SELF-CONFIGURED PROCESSING (FORM 206)

The FORM 206 is comprised of OBJECT ID 346, PRIORITY ASSIGN 44, and X-Y INTERPOLATE 348 circuits, which can receives a sequence of digital video signal blocks from PREM 202. It will then analyze the application requirements 356, run-time bandwidth limitations, and internal storage and processing constraints, assign 344 appropriate priority level for each video object, and generate an appropriate internal format for further encoding, storage, and decoding of the said video signal blocks.

The FORM 206 is furhter comprised of X-Y EXTERPOLATE circuits which can reconfigure the internal signal blocks to external format prior to postprocessing and outbound transmisson.

F. UNIFIED PACKET CONTROL PROCESSING (PACK 210)

The PACK 210 provides an unified method for internal storage and external transmission of the video signal blocks. The PACK 210 further partition all encoded digital video signal blocks into sequence of packets. Each macroblock 306 is further comprised of a plurality of packets. Besides the default and bit-parallel packet transfer mode for MACRBLOCK data, the internal VISC bus 402 architecture can also be reconfigured to support a plurality of circuit transfer modes, which includes burst FRAME transfer, burst SUB-FRAME transfer, burst ROI OBJECT transfer, burst BOLUT 236 table transfer, burst FRAME DIFFERENTIAL BIT-MAP transfer, and burst SLUT table transfer. As a result, contrary to the traditional CISC and RISC systems treats bit as a smallest data entity. VISC 112 treats packet as the smallest entity, and in turn assemble and group indiviual data bits together for non-VISC data processing.

G. SCALABLE MEMORY-ARRAY RECONFIGURABLE ARCHITECTURE (SMART 216)

The SMART 216 is comprised of ROTATE 358, LINEAR SHIFT 360, and ZOOM/REDUCE 362 circuits, which can manipulate the motion video object data blocks referencing from the SMART 216. The SMART 216 can further send request to FORM 206 in further reducing the storage requirements for internal video signals. The SMART 216 can further send request to FORM 206 in further resuming the video data conforming to external data format requirements.

SMART 216 can also respond to a plurality of run-time application or networking queries, and reference the internal stored packet data, then reformat and update them according to the run-time priority changes.

SMART 216 can further partition and store the forground moving objects and background still images into seperate memory segments. According to the run-time networking and application requirements 356, SMART 216 can work with FORM 206 in dynamically adapting to the priority levels, quality requirements 356, and networking constraints,

H, ANALOG AND DIGITAL POSTPROCESSING (POST 222)

POST 222 is comprised of a plurality of output circuits connected to DEC 220, which can receive a decoded video signals. It then generates and translate them into a plurality of reformatted video signals for further displaying, faxing 110, or printing out the decoded video signal.

POST 222 is comprised of a plurality of DISPLAY circuits, which includes but not limit to VGA 242, RGB 244, NTSC 246. POST 222 also comprised of a PRINT/FAX circuit, which receive a internal video data and generate a output conforming to EPS 248 data format.

VISC ARCHITECTURE AND ORGANIZATION

FIG. 4 illustrates the design example of a single chip VISC 112 integrated circuit. This provides a unified VISC 112 microprocessor solution suitable for all major system applications related to digital 106, videophone 104, and multimedia computing.

The diagramatic representation illustrated in FIG.4 comprises the following major system components. They are a preprocessing/motion processor (PREM) 202, a system look-up-table (SLUT 234), a bandwidth controller (BAND 204), a formatting processor (FORM) 206, a encoding processor (ENC) 208, a packet processor (PACK) 210, a scalable memory array reconfigured architecture (SMART) 216, a application priority interface (API 232), a bandwidth overlay look-up-table (BOLUT) 236, an application coprocessor (COP) 230, a decoding processor (DEC) 220, a postprocessor (POST 222), a transmission processor (TX 212), a receiving processor (RX) 214, and a system controller (CON) 218.

The system components are interconnected internally through a SYSTEM BUS 402 and a CONTROL BUS 404. The CONTROL BUS 404 allows the CON 218, BAND 204, and SLUT 234 to control, access, and communicate with other system components such as BAND 204, PREM 202, FORM 206, ENC 208, DEC 220, COP 230, API 232, PACK 210, and SMART 216. The SYSTEM BUS comprises a plurality of BUS TRANSFER control modes. The standard default mode allows the SYSTEM BUS 402 to perform packet switched transportation of data, control, and operation maintenance packets among various system components. In addition, the system bus 402 can be reconfigured into a plurality of selective circuit switch modes, in order to allow burst transportation of full frame, partial frame, live motion objects, graphics overlay, or other non-VISC data types. Both SYSTEM BUS 402 and CONTROL BUS 404 are bidirectional parallel bus, Due to the real time performance requirement for high speed video frame processing, three system-wide pipeline interconnections are implemented. The first is the local video pipeline consist of a direct interconnection between PREM 202, FORM 206, ENC 208, PACK 210, SMART 216, RX 214/TX 212. The second system interconnect is a application priority pipeline consist of a direct interconnection between the API 232/COP 230, BOLUT 236, BAND 204, SLUT 234, FORM 206, and PACK 210. The third system interconnect is a remote video communiation pipeline consist of a direct interconnection between the RX 214, PACK 210, SMART 216, FORM 206, ENC 208/DEC 220, POST 222/TX 212. In order to facilitate these pipelined interconnections, first-in-first-out memory devices are inserted where appropriate. Other Private buses are provided between TX 212, RX 214, and PACK 210, FORM 206 and ENC 208, ENC 208 and DEC 220, DEC 220 and COP 230, COP 230 and API 232, DEC 220 and POST 222, PREM 202 and FORM 206, PREM 202 and SLUT 234, PACK 210 and SMART 216, and SLUT 234 and BAND 204.

The diagramatic representation illustrated in FIG. 4 further comprises the following input and output pins. They are 32 bit video input pins, 32 bit video output pins, 32 bit application parallel input/ouput (PIO) pins, 24 bit tag/control input/output pins, and 8 bit serial communication input and output (SIO) pins.

The first group of 32 video input pins connected to PREM 202, whcih receives four set of individual eight-bit digital color input data, i.e., red (R), green (G), blue (B), and arbitrary (X). These input pins can be multiplexed to receive external address, status, tag, control, and interface signals, and to transport program and data directly from external memory.

A second group of 32 video output pins is connected to POST 222, whcih can generate four sets of eight-bit output signals for external display, printing, or fax 110. These output pins can be also multiplexed to transmit internal address, status, tag, control, and interface signals, and to transport program and data directly to external memory. The input and output data ports can further be multiplexed to form a single group of 32 bidirectional input/ouput pins in a baseline implementation. Furthermore, additional input and output pins can be included for transporting address, tag, control, status analog video, and other non-VISC data signals.

Thers is a third group of 32 bi-directional parallel input/output (PIO) pins connected to API 232, which is multiplexed to import and export plurality of control and data types including but not limited to: application and system control commands, priority requests, application requirements 356, communication and status messages, and program and data sequences. For a more baseline implementation, PIO can be reduced to 8 or 16 pins for lower post packaging. Reversely, PIO can also be expanded to 64 or higher pins for higher performance implementation. PIO can further be connected to a time-division-multiplex (TDM), packet-division-multiplex (PDM) local bus interface (LBI), or small computer system interface (SCSI 110) circuits in order to facilitate the high speed burst data transportation.

There is further a fourth group of 24 tag and control input and output pins connected to the SLUT 234 and CON 218, hich provides the required power, ground, clocking, status, control and tag signals. The pins numbers can be modified according to system performance requirements.

There is further a fifth group of 8 serial communication input and output (SIO) pins connected to the RX 214 and TX 212, which simultaneously receives and transmits four channels of full-duplex video signals. The SIO pins numbers can be modified to meet application requirements 356.

The PREM 202 integrated circuit is comprised of video preprocessors and motion processor, which receives analog or digital video, graphics, or still images and generate FRAME DIFFERENTIAL BIT MAP 304, MOTION VECTOR 302, and MACROBLOCK profile for each input frame. The PREM 202 is also comprised of a PREPROCESSOR circuit which receives other non-VISC data types, and preprocess 350 them into VISC 112 executable formats. The CON 218 is comprised of SLUT 234 circuit which receives FRAME DIFFERENTIAL BIT MAP 304 from PREM 202, and generates a run-time bandwidth profile for each input frame including compression ratio, frame rate, and display resolution. The CON 218 is also comprised of a INSTRUCTION LOOK-AHEAD 338 circuit, which recieves a GRANT 335 signal from BAND 204 and translate the run time bandwidth profile into a group of predefined instruction address pointers. The CON 218 is further comprised of a GROUP INSTRUCTION PREFETCH 340 circuit which receives the instruction pointers and generate a sequence of run-time executable instructions for the input frame.

The BAND 204 integrated circuit is comprised of a BWREQ 332 circuit which receives the FRAME DIFFERENTIAL BIT-MAP 304 from PREM 202 and generate a run-time bandwidth requirement (BWREQ 332) signal for each input frame. The BAND 204 is also comprised of BWCAP 330 circuit which during the VISC 112 sytem initialization (SETMODE 376), receives a set of bandwidth constraints relating to internal processing and storage and external communication. The BAND 904 is further comprised of a BWALLOW 334 circuit which compare the system bandwidth constraints with the BWREQ 332 signal and determine whether the VISC 112 system has sufficient run-time bandwidth. Provided the bandwidth is sufficient, the BAND 204 will generate a GRANT 335 signal to CON 218 in order to enable the SLUT 934 to search and prefetch 340 the run-time instruction sequences. Provided the bandwidth is insufficient, the BAND 204 will issue a CONDITIONAL BRANCH 336 and request the FORM 206 to reformat the input frame and further reduce the run-time bandwidth requirement.

The FORM 206 is comprised of a OBJECT ID 346 circuit, which receives standard MACROBLOCK subimages 306 from PREM 202, and generate a list of moving objects for each input frame. The FORM 206 is also comprised of a PRIORITY ASSIGN 344 circuit, which evaluate application requirement from API 232 and communication constraint from BAND 204, and assign 344 the appropriate run-time priority level to each moving object and MACROBLOCK subimage. Provided the run-time bandwidth is insufficient, The FORM 206 is further comprised of an X-Y INTERPOLATE 348 circuit, which receives MACROBLOCK subimages, moving objects, and their associated run-time priority levels and produces a reformatted MACROBLOCK subimage and moving objects. Once the run-time bandwidth is proven to be sufficient, the FORM 206 is furhtercomprised of DATA TRANSFER circuit which will transfer the formatted macroblock 306 subimage to ENC 208 and PACK 210 for further processing.

The ENC 208 is comprised of a programmable ENCODING circuit which receives input macrblocks and generate JPEG, MPEG, H.261, VQ, or alike encoded video tokens depending on the application requirement. The ENC 208 circuit can perform all pixel domain and transform domain encoding functions.

The PACK 210 is comprised of a PACKETIZER circuit, which receives internally reformatted macroblock 306 subimage, and further partition into a plurality of data packets. The PACK 210 is also comprised of a PACKET CONTROL circuit, which generates the required control messages for both internal and external data movement, error detection and correction, and flow control management functions. The PACK 210 is further comprised of a PACKET/CIRCUIT BUS INTERFACE circuit, which can program the internal bus into a packet switch mode, or a selective high speed burst circuit modes for the transportation of moving objects, macroblock 306 subimages, or full frame images.

The SMART 216 is comprised of a SCALABLE MEMORY ARRAY, which receives data packet from PACK 210, and automatcally self-configure into a plurality of internally formatted entities for temporary storage. The SMART 216 is also comprised of a REFORMAT circuit, which receives run-time bandwidth constraint from BAND 204, or receives a run-time application priority request from API 232, and self configured to the appropriate data storage format conforming to these run-time networking and application requirements 356. The SMART 216 is furhter comprised of a FOREGROUND PROESSOR circuit, which can tranceive, prioritize, manipulate, and store foreground data objects. The SMART 216 is further comprised of a BACKGROUND PROESSOR circuit, which can tranceive, prioritize, manipulate, and store backgroung data macroblocks 306. The SMART 216 is further comprised of a DATA MANIPULATION circuit, which generates the address pointer reference list to rotate 358, linear shift 360, enlarge, or reduce 362 the specified data object. The SMART 216 is further comprised of a SIMULATOR circuit which generate instruction sequences for visualizing artificial knowledge or object data movement.

The TX 212 and RX 214 are comprised of a single or plurality pair of TRANSCEIVERS circuits, which can import and export video and non-VISC data. The TX 212 is also comprised of an QUERY circuit, which can generate a REQUEST signal to inquire about external networking and bandwidth stability conditions. The RX 214 is also comprised of an INTERPRETER circuit, which can receive and decode external networking and bandwidth control information and generate a ALERT 352 signal to BAND 204 in case abnormal networking conditions are happening.

The DEC 220 is comprised of a programmable ENCODING circuit, which receives encoded macrblock tokens and generate JPEG, MPEG, H.261, VQ, or alike macroblock 306 pixel images depending on the application requirement. The DEC 220 circuit can perform all pixel domain and transform domain decoding functions.

The POST 222 is comprised comprised of a plurality of analog and digital postprocessors, which receives digital decoded video pixel runs and generate the appropriate formated signal for NTSC 246, PAL, SCAM, RS-170, G3, G4, or EPS 248.

The COP 230 is comprised of a RISC or CISC crcuit, which receives preprocessed 350 non-VISC data types from PREM 202 and perform traditional data processing tasks.

The API 232 is also comprised of a INTERFACE circuit, which receives application priority requirements 356 and generate the appropriate message signal to FORM 206 in further assigning 344 the run-time priority levels 344 for each object and subimage. API 232 is further comprised of DRIVER circuit, which alow API 232 to directly interface with a plurality of external commercial DOS, UNIX, WINDOW, NT, or OS2 application programs. API 232 is also comprised of a programmable BIOS circuit, which allow the VISC 112 to be executed under a commercial UNIX, DOS, NT, WINDOW operating system.

The BOLUT 236 is comprised of a set of system LOOK-UP-TABLE circuits, whcih can be dynamically generated to providea plurality options for multiple data type selections. The BOLUT 236 is also comprised of a PRIORITY SENSITIZER circuit, which receives RUN-TIME APPLICATION PRIORITY request signal from API 232, and produces an appropriate set of run-time media profile for further execution.

SUMMARY AND ADVANTAGES OF VISC

Each of the above aspects of the invention, when taken together, result in a significant integrated circuit system optimized for video instruction set computing. The present invention pertains to integrated circuit system based on the novel architecture of Video-Instruction-Set-Computing (VISC 112). The integrated circuit comprises a plurity of functional units to independently execute the tasks of remote communication (RX 214, TX 212), bandwidth adaptation (BAND) 204, application control (API) 232, multimedia management (PACK) 210, and universal video encoding (ENC 208, DEC 220). The integrated circuit is also comprised of a scalable formatter element (FORM) 206 connecting to the functional units which can inter-operate arbitrary external video formats and intelligently adapt to selective internal format depending upon the system throughput and configuration. Additionally, there is a smart memory element (SMART) 216 connecting to the functional units and scalable formatter (FORM) 206, which can access, store, and transfer blocks of video data based on the selective internal format. In the preferred embodoment, the integrated circuit is also comprised of an embedded RISC or CISC co-processor element (COP) 230 in order to execute DOS, Window, NT, Macintosh, OS2, or UNIX applications. In a more preferred embodiment, the integrated circuit includes a real time object oriented operation system element wherein concurrent execution of the application program and real time VISC 112 based video instruction sets can be performed.

The present invention is designed to sustain the evolution of a plurity generations of the VISC 112 microprocessors. These novel VISC 112 microprocessors can be efficiently used to perform wide range of real time distributed video signal processing functions for applications such as interactive video, HDTV 106, and multimedia communications.

In summary, our present invention can provide the following advantages:

a. It provides a unified microprocessor integrated circuit for digital TV 106, videophone 104, and multimedia computer 108 design.

b. It provided the most optimimum performance for video specific application tasks.

c. It is equally capable of traditional data processing of non-video 240 data types.

d. It can conveniently interface with traditional DOS, UNIX, and WINDOW applications.

e. It can be executed under traditional DOS, WINDOW, NT, OS2 or UNIX operating system environments.

f. It can apply traditional RISC and CISC microprocessors as coprocessors.

g. It can provide Internal formatting and smart memory allocation for scalable performance.

h. It can provide run-time bandwidth management.

i. It can conform with application-specific priority requirements 356.

j. It can provide intruction Look-ahead, superscaler, and superpipelining for enhancing system performance.

While our above description contains many specifications, these should not be constructed as limitations on the scope of the invention, but rather as an exemplification of one preferred embodiment thereof. Many other variations are possible. For example, a single chip implementation may further contains other still image processing circuits, or a parallel processor implementation can be provided to a ultra-high performance supercomputing system. Furthermore, many exotic, untested embodiments and minor variations can be provided to further improve the processing speed for ENC 208, DEC 220, PACK 210, TX 212, and RX 214. However, our intention has always been in the design of a low cost and yet upgradable integrated circuit solution for massive consumer, communications, and desktop or embedded computing applications.

Accordingly, scope of the invention should be determined not by the embodiment(s) illustrated, but by the appended claims and their legal claims.

We claim:

1. An integrated system optimized for a video-instruction set executing a plurality of applications for the storage, retrieval and scaleable formatting of video data, comprising:

a frame capture state;

first data processing means for the selective receipt of a local or remote signal, said first data processing means preprocessing the remote signal to produce a real-time frame differential bit map and microblocks subimages at said frame capture stage during a first period of time;

first controller means producing a run time object priority assignment signal in accordance with said microblock subimages during a second period of time subsequent to said first period of time;

second controller means for producing and prefetching look-ahead group instruction sequences for run-time execution of each of said microblock subimages in accordance with said run-time object priority assignment;

third controller means connected to said first data processing means for producing a run-time bandwidth requirement signal for each of said microblock subimages in accordance with said frame differential bit map, based upon said prefetching look-ahead group instruction sequences produced during said first period of time;

second data processor means connected to said first data processor means and said second controller means for scaleable data formatting of the microblock subimage data to a compatible internal format in accordance with said run-time object priority assignment;

third data processor means connected to said second data processor for encoding said compatible internal format of said microblock subimages to produce encoded microblock subimages;

fourth data processor means connected to said third data processor means for packaging said encoded microblock subimages based upon said prefetched instruction-look-ahead sequences to produce packaged data, said fourth data processor means further comprising a transmitter means for remote network transmission;

scaleable and reconfiguration data memory means for receipt of said packaged data and automatically self-configuring said packaged data into a plurality of internally storable entities, said scaleable and reconfiguration data memory means comprising at least one memory cell and their associated sensing, register, control, management and interface circuits, as well as a run-time adaptive decision-making logic means for receiving a set of run-time variables corresponding to user, application, and networking conditions, and producing a run-time executable data storage configuration in order to address, store, and retrieve the most recently-optimized run-time video articles or objects;

decoder means connected to said scaleable and reconfigurable data memory and said prefetched instruction-look-ahead sequences to produce a decoded signal; and display means connected to said decoder means for post processing said decoded signal in accordance with said prefetched instruction-look-ahead sequences, said display means comprising a plurality of display, facsimile or printer adapters.

2. The system in accordance with claim 1 wherein said first data processing means comprises a video input capturer, a graphics input bit-map adaptor, a retrieval and storage register for said input signal processor, a frame differentiation processor; a motion processor, a foreground video object processor, a background image processor, at least one integrated sensor, and analog or digital preprocessor and storage means for non-video related data input.

3. The system in accordance with claim 1 wherein said first controller means comprises a priority assignment circuit, a priority reassignment circuit, and an object identification processor for producing run-time media object data types conforming to run-time bandwidth availability.

4. The system in accordance with 1 wherein said third controller means comprises a run-time attribute processor for producing run-time compression ratio, frame rate, and display resolution.

5. The system apparatus in accordance with claim 1 wherein said second controller means comprises a look-ahead-pipeline processor element for receiving an inbound differential video signal including bit-map, microblock, and motion vector, and producing a group of predefined instruction sequences for run-time execution.

6. The system apparatus in accordance with claim 1 wherein said second data processor means comprises an interpolating and extrapolating processor, an instruction and task prescheduler, a dynamic data formatter, a dynamic program scheduler and optimizer means and a scaling circuit means for reformatting an inbound signal to an appropriate internal format according to the run-time bandwidth requirement producing a coherent instruction bit stream for encoding processing, and controller means for invoking system calls for adjusting system clock rate, and resetting other system parameters.

7. The system apparatus in accordance with claim 1 wherein said third data processing means comprises a programmable encoder, a task queue, a pipeline buffer, and an interface circuit for selective on-board or off-board encoding of an internally formatted input still or motion video signal.

8. The system apparatus in accordance with claim 1 wherein said fourth data processing means comprises a multiple Layer protocol processing and control device, a pipeline buffer and register, an address generation device, and an external data interface circuit.

9. A system apparatus in accordance with claim 1 wherein said scalable and reconfigurable data is further comprised of a pointer manipulation circuit for receiving run-time requests to move, overlay, rotate, enlarge, or reduce a single or plurality of stored video articles, and producing the appropriate alternative referencing parameters for run-time manipulation of said video articles without physically modifying or moving their address or data.

10. A system apparatus in accordance with 1 wherein said decoder means comprises a programmable decoder, a task queue, a pipeline register and buffer, and an external data interface circuit.

11. An integrated system optimized for a video-instruction set executing a plurality of applications for the storage, retrieval and scaleable formatting of video data, comprising:

first data processing means for the selective receipt of a local or remote signal, said first data processing means preprocessing the remote signal to produce a real-time frame differential bit map and microblocks subimages;

first controller means producing a run time object priority assignment signal in accordance with said microblock subimages;

second controller means for producing and prefetching look-ahead group instruction sequences for run-time execution of each of said microblock subimages in accordance with said run-time object priority assignment;

third controller means connected to said first data processing means for producing a run-time bandwidth requirement signal for each of said microblock subimages in accordance with said frame differential bit map;

second data processor means connected to said first data processor means and said second controller means for scaleable data formatting of the microblock subimage data to a compatible internal format in accordance with said run-time object priority assignment;

third data processor means connected to said second data processor for encoding said compatible internal format of said microblock subimages to produce encoded microblock subimages;

fourth data processor means connected to said third data processor means for packaging said encoded microblock subimages based upon said prefetched instruction-look-ahead sequences to produce packaged data, said, fourth data processor means further comprising a transmitter means for remote network transmission;

scaleable and reconfiguration data memory means for receipt of said packaged data and automatically self-configuring said packaged data into a plurality of internally storable entities, said scaleable and reconfiguration data memory means comprising at least one memory cell and their associated sensing, register, control, management and interface circuits, as well as a run-time adaptive decision-making logic means for receiving a set of run-time variables corresponding to user, application, and networking conditions, and producing a run-time executable data storage configuration in order to address, store, and retrieve the most recently-optimized run-time video articles or objects;

a decoder means connected to said scaleable and reconfiguration data memory and said prefetched instruction-look-ahead sequences to produce a decoded signal; and display means connected to said decoder means for post processing said decoded signal in accordance with said prefetched instruction-look-ahead sequences, said display means comprising a plurality of display, facsimile or printer adapters.

12. The system in accordance with claim 11 wherein said first data processing means comprises a video input capturer, a graphics input bit-map adapter, a retrieval and storage register for said input signal processor, a frame differentiation processor, a motion processor, a foreground video object processor, a background image processor, at least one integrated sensor, and analog or digital preprocessor storage means for non-video related video input.

13. The system in accordance with claim 11 wherein said first controller means comprises a priority assignment circuit, a priority reassignment circuit, and an object identification processor for producing run-time media object data types conforming to run-time bandwidth availability.

14. The system in accordance with claim 11 wherein said third controller means comprises a run-time attribute processor for producing run-time compression ratio, frame rate, and a display resolution.

15. The system apparatus in accordance with claim 11 wherein said second controller means comprises a look-ahead-pipeline processor element for receiving an inbound differential video signal including bit-map, microblock, and motion detector, and producing a group of predefined instruction sequences for run-time execution.

16. The system apparatus in accordance with claim 11 wherein said second data processor means comprises an interpolating and extrapolating processor, an instruction and task prescheduler, a dynamic data formatter, a dynamic program scheduler and optimizer means, and a scaling circuit means for reformatting an inbound signal to an appropriate internal format according to the run-time bandwidth requirement, producing a coherent instruction bitstream for encoding processing, and controller means for invoking system calls for adjusting system clock rate, and resetting other system parameters.

17. The system in accordance with claim 11 wherein said third data processing means comprises a programmable encoder, a task queue, a pipeline buffer, and an interface circuit for selective on-board or off-board encoding of an internally formatted input still or motion video signal.

18. The system apparatus in accordance with claim 11, wherein said fourth data processing means comprises a multiple layer of protocol processing and control device, a pipeline buffer and register, and address generation device, and an external data interface circuit.

19. A system apparatus in accordance with claim 11 wherein said scaleable and reconfiguration data memory means is further comprised of a pointer manipulation circuit for receiving run-time requests to move, overlay, rotate, enlarge, or reduce a single or plurality of stored video articles, and producing the appropriate alternative referencing parameters for run-time manipulation of said video articles without physically modifying or moving their address or data.

20. The system apparatus in accordance with claim 11 wherein said decoder means comprises a programmable decoder, a task queue, a pipeline register and buffer, and an external data interface circuit.

* * * * *